Nov. 4, 1969  P. R. CHIRCO  3,475,945
CLEARANCE TOOL ASSEMBLY
Filed May 15, 1967
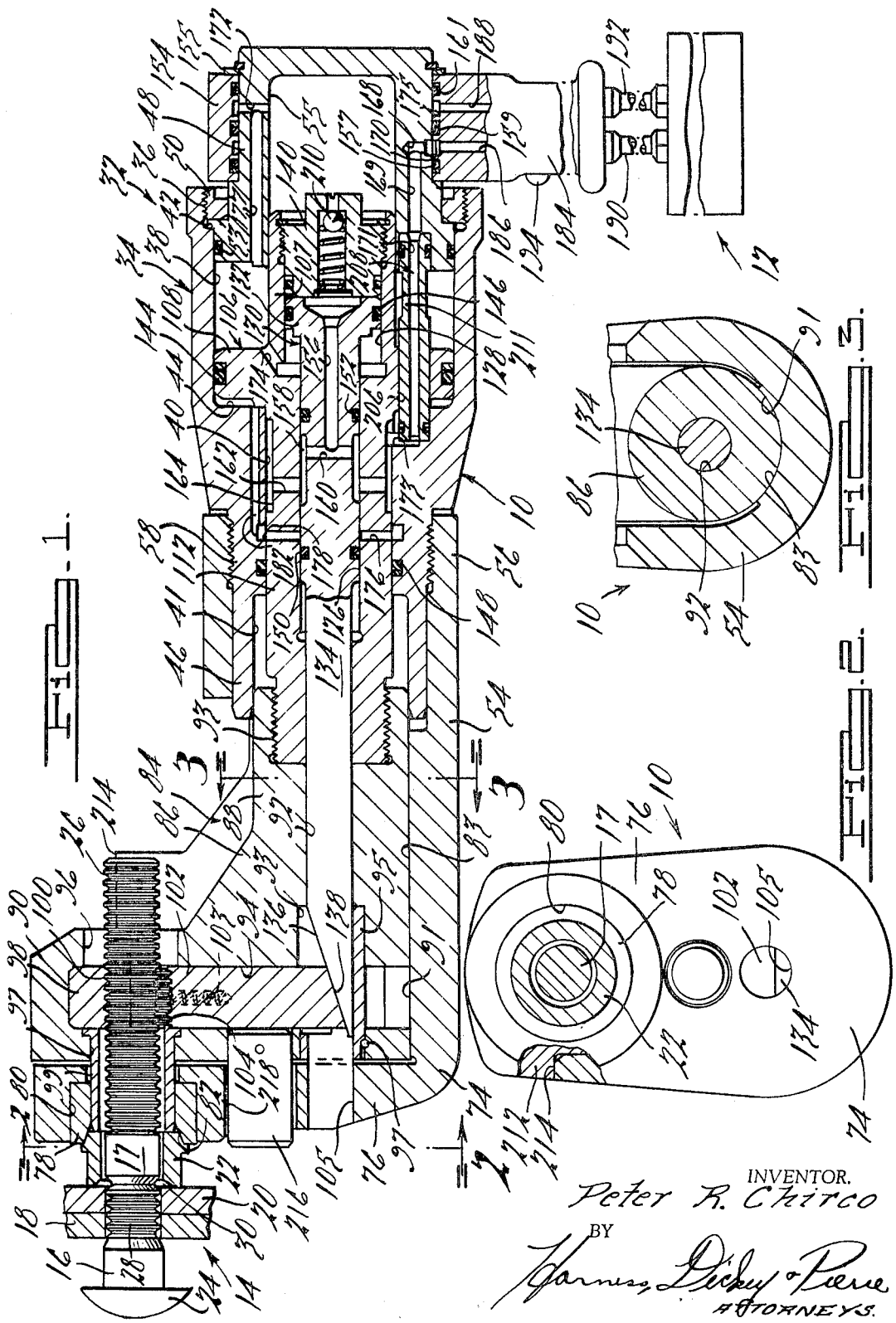
INVENTOR.
Peter R. Chirco
BY
Harness, Dickey & Pierce
ATTORNEYS.

United States Patent Office 3,475,945
Patented Nov. 4, 1969

3,475,945
CLEARANCE TOOL ASSEMBLY
Peter R. Chirco, Utica, Mich., assignor to Huck Manufacturing Company, Detroit, Mich., a corporation of Michigan
Filed May 15, 1967, Ser. No. 638,273
Int. Cl. B21d 9/05
U.S. Cl. 72—391                                 12 Claims

ABSTRACT OF THE DISCLOSURE

A fastener driving tool constructed to be operable in small clearance areas. The tool is provided with a collet member laterally spaced from the axis of the pulling means used for setting the fastener. The tool includes support means for guiding the collet member for reacting the moment resulting from the lateral spacing between the collet and the pulling means.

---

This invention relates to tools for driving fasteners and more particularly for driving fasteners of the two-piece type which are set by the application of a relative axial force between the two pieces.

While the tool of the present invention is capable of use with a variety of two-piece fasteners, its operation will be discussed in conjunction with a two-piece fastener of the lockbolt type as shown and described in the patent to L. C. Huck, No. 2,531,048, issued Nov. 21, 1950. In general the tool of the present invention is a modification of that shown in the patent to G. J. Van Hecke, No. 3,197,840, issued Aug. 3, 1965, and the disclosure of that patent is incorporated herein by reference. The tool of the present invention provides structure to prevent cocking of the collet which could result in damage especially when larger sized fasteners and greater loads are encountered. Therefore, it is an object of the present invention to provide a tool of the type shown in the patent to Van Hecke in which cocking of the collet is prevented. In setting a lockbolt the conventional tool is placed in line with the pin of the lockbolt and has considerable bulk which extends directly in line from the lockbolt. In open areas these tools can be freely used; however, in small clearance areas such as channels, etc., these tools cannot be used. The tool of the present invention has little structure immediately in line with the fastener and can be used in such small clearance areas. It is an object of this invention to provide a tool capable of use in small clearance areas for setting fasteners of the above-described type.

It is a general object of this invention to provide a tool having a novel construction for setting fasteners of the above-described type.

The manner of accomplishing the foregoing objects, and other objects and features of the invention, will become apparent from the following detailed description of an embodiment of the invention when read with reference to the accompanying drawing in which:

FIGURE 1 is a side elevational, partially sectional view of a tool, embodying a preferred form of this invention, shown in assembly relationship with a source of power for actuating the tool and with a fastener of a type to be set by the tool;

FIGURE 2 is a front elevational view of the tool shown in FIGURE 1; and

FIGURE 3 is a cross-sectional view of the tool of FIGURE 1 taken substantially along the line 3—3 in FIGURE 1.

Looking now to FIGURE 1, a tool assembly 10, embodying the features of this invention, is shown in assembly relationship with a source of hydraulic pressure 12 and with a fastener 14. The fastener 14, for representative purposes only, is shown to be of the lockbolt type and includes a collar 22 and a pin member 16 having a shank 17 shown to be extending through a pair of aligned bores in a pair of workpieces 18, 20 to be secured. The pin member 16 has at one end of the shank 17 an enlarged head 24 which is engageable with one workpiece 18; the collar 22 is placed over the shank 17 and in engagement with the other workpiece 20. In setting the fastener 14, the pin 16 is gripped at a plurality of pull grooves 26 at the end of the shank 17 opposite the head 24 and a swaging anvil engages the collar 22. A relative axial force is then applied between the pin 16 and the collar 22 until the head 24 engages the workpiece 18; as this force is increased, the anvil swages the collar into a plurality of locking grooves 28 in the shank 17 thereby securing the collar 22 and pin 16 together. As the relative force is increased the end or pintail portion of the pin 16 is severed from the shank 17 at a reduced diameter break-neck 30. A lockbolt, such as 14, is shown in a set position, prior to fracture of the pintail in FIGURE 2 of the previously referred to Huck patent.

In general the tool 10 has a drive piston 106 which is hydraulically actuated to move a collet 84 reciprocably relative to the fastener 14. The collet 84 has a chuck jaw assembly having an opening for receiving the shank 17 of the pin 16 with the axis of the opening laterally offset from the axis of the drive piston 106. By laterally offsetting the chuck jaw assembly from the drive piston 106, the area directly behind the chuck jaw assembly can be opened thereby providing clearance for operation in channels, etc.

More specifically the tool 10 has at its rearward end, a cylinder housing assembly 32 which includes an outer cylinder housing 34 having a central aperture extending therethrough which is defined by coaxial bores 36, 38, 40 and 41. The bores 36, 38 and 40 are of decreasing diameters respectively, with a pair of radially inner shoulders 42 and 44 being defined by the juncture of bores 36 and 38 and 38 and 40, respectively. The bore 41 is at the forward end 46 of the housing 34 and is greater than bore 40. A cup shaped cap 48 is located at the end of and extends partially into bore 38 and is held against shoulder 42 by a nut 50 threaded into threaded bore 36. A seal 53 seals bore 38 and cap 48. A reduced diameter cavity 55 in cap 48 is in communication with bore 38.

An elongated collet housing 54 has an annular end portion 56 which is threaded onto a threaded portion 58 on the forward end 46 of housing 34 whereby collet housing 54 and housing 34 are secured together.

The collet housing 54 has a forward portion 74 which extends longitudinally from the end portion 56 and which terminates at its forward end in a generally flat anvil portion 76. The anvil portion 76 extends transversely upwardly from and partially beyond the remainder of the forward portion 74. A tubular anvil member 78 is mateably located in a counterbore in a longitudinally extending through bore 80 in the anvil portion 76. The anvil member 78 can be of a conventional construction well known in the art and has a flared opening 82 defined by a surface engageable with the collar 22 for swaging the collar 22 to the pin 16. The top of the forward portion 74 behind the anvil portion 76 is opened and has a generally semi-cylindrical concave cavity 83 defined by an internal surface 91 for receiving and permitting movement of the collet assembly 84 therein. The opening 82 in anvil 78 is laterally offset a sufficient distance relative to the axis of the bores 38, 40, 41 and of the end portion 56 such that the area proximate the rear of anvil 78 is clear.

The collet assembly 84 includes a collet body 86 which has an elongated tubular portion 88 integral with a jaw housing 90 located at its forward end. The jaw housing 90 extends laterally from and partially beyond the tubular portion 88. The internal surface 91 of cavity 83 of the forward portion 74 of the collet housing 54 is contoured similarly to the outer surface of the tubular portion 88. Thus the collet body 86 which is located within the forward portion 74 of the collet housing 54 fits mateably and slidably within cavity 83. A bore 92 extends through the tubular portion 88 and terminates in a partially threaded counterbore 93 at its rearward end. A generally rectangular aperture 94 extends from the bottom of collet body 86 through the tubular portion 88 in communication with bore 92 and upwardly partially into the jaw housing 90. A bore 96 extends longitudinally through the jaw housing 88 and transversely through the aperture 94. The bore 96 which has its axis spaced above the axis of the bore 92 is located relative to the lower surface of the collet body 86 such as to be coaxial with the flared bore 82 in the anvil 78. The bore 96 is offset a sufficient distance from the tubular portion 88 such that the area proximate to its rearward end is clear. The anvil portion 76 and jaw housing portion 90 are provided of a minimum width; the cylinder housing assembly 32 defines an unconfined clearance space in the area immediately adjacent to the anvil portion 76 whereby the tool 10 can be used in small clearance areas. This clearance permits use of the tool 10 in channels, etc. A tubular collar ejector 99 is located in and extends beyond the forward portion 97 of bore 96 and serves to eject the collar 22 from the anvil 78 after it has been swaged to pin 16 and upon the return stroke of the tool.

An upper jaw member 98 is fixed in the upper portion of the aperture 94 in the jaw housing 90. The jaw member 98 has a substantially semicircularly shaped inner surface 100 having a plurality of radially projecting annularly extending teeth which extend into the bore 96. A lower jaw member 102 is slidably located within the aperture 94 just below the bore 96 and also has a substantially semicircularly shaped inner surface 104 having a plurality of radially projecting annularly extending teeth which extend toward the bore 96 oppositely from the teeth on fixed jaw member 98. The teeth on the surfaces 100 and 104 of the jaw members 98 and 102, respectively, are provided with a contour similar to the contour of the gripping grooves 26 of the pin 16 whereby the jaw members 98 and 102 are capable, in a manner to be seen, of gripping the pin 16. While the teeth on surfaces 100 and 104 are shown to be individual semi-annular mmebers, the teeth could extend helically for engagement with a threaded shank; the surfaces 100 and 104 could be provided with teeth for gripping a pin having a plain or smooth shank. The movable jaw member 102 is urged downwardly away from the fixed jaw member 98 by a pair of biasing springs 103. After gripping the pin 16 by jaws 98 and 102, the fastener 14 is set by a relative axial force applied between the pin 16 and collar 22. To apply this relative force the collet body 84 is fixed to and movable with the drive piston member 106.

The drive piston member 106 has its head 108 located for reciprocable movement within the cylinder bore 38;
the piston member 106 has a reduced diameter rearward portion 107 which is piloted in and reciprocable in the bore 55 in cap 48. A rod 112 extends coaxially forwardly from the head 108 and mateably through the bore 40 in the end 46 in housing 34. The forward end of rod 112 is externally threaded and is threaded into the threaded counterbore 93 of the collet body 86 whereby the collet body 86 is moved by the piston member 106. While the drive piston member 106 is actuable to move the collet assembly 84, a jaw lock piston 130 is actuable to move the lower jaw member 102 toward the fixed jaw 98 whereby the pin 16 of the fastener 14 can be gripped.

The jaw lock piston 130 has a piston head 132 reciprocably located within a cylinder 128 in the drive piston head 108 and portion 107 and has a longitudinally extending rod 134 extending mateably, coaxially through a central bore 126 in rod 112 of drive piston 106 and through bore 92 in collet body 86. The rod 134 terminates at its free end in a radially inwardly inclined flat surface 136 which is engageable with a similarly inclined surface 138 at the lower extremity of the movable lower jaw 102. With the jaw lock piston 130 in its rearwardmost position, as shown in FIGURE 1, the inclined surface 138 of lower jaw member 102 is at the bottom of the inclined surface 136 and hence the lower jaw member 102 is moved downwardly via springs 103 away from the aperture 96 in the jaw housing 90 and out of engagement with the pin 16. With the jaw lock piston 130 in its forwardmost position, the inclined surface 138 of jaw member 102 is moved upwardly along the inclined surface 136 and hence the lower jaw member 102 is moved upwardly toward the aperture 96 in jaw housing 90 and into engagement with the pin 16. The anvil portion 76 has an opening 105 in line with the lock piston 130 into which the piston 130 can partially extend in its forwardmost position.

The forward portion 93 of bore 92 is enlarged, a support bushing 95 is located therein and fixed by a pin 97 and blocks the lower end of the slot 94 while providing support for the tapered end 136.

A cap 140 is threaded into the outer end of the cylinder 128 for sealing that end of the cylinder; the cap 140 is further held by a snap ring located in a circumferential groove. The cap 140 is provided with an annular seal for sealing the cylinder 128.

The piston head 108 of the driven piston 106 has an annular sealing ring 144 for providing a seal between opposite sides of the head 108 within the bore 38. In a similar manner, an annular seal 146 in the piston head 132 of the lock piston 130 seals between opposite sides of the head 132 within the cylinder 128. An annular seal 148 in a groove in bore 40 of the cylinder housing 34 seals between bore 40 and the rod 112 of the drive piston 106. Annular seals 150 and 152 in grooves in rod 134 of lock piston 130 seal between rod 134 and bore 126 in rod 112 of drive piston 106.

In using the tool 10, a fastener, such as fastener 14 has the shank 17 of the pin 16 inserted through the bore 96 and through the opening between chuck jaws 98 and 102. At this time the driven piston 106 is in its forward position in the cylinder 110 and the jaw lock piston 130 is in its rearward or retracted position in the cylinder 128 (see FIGURE 1). With the lock piston 130 retracted the lower, movable jaw member 102 is in its lower position away from the bore 96 permitting the pin 16 to be inserted therethrough. At this time the anvil 78 is in engagement with the collar 22.

Before the pin 16 can be pulled, the lower jaw 102 must be moved upwardly to grip the shank 17. In conventional tools, the chuck jaws must be moved axially rearwardly prior to engagement with the shank. With the tool 10, the pin 16 is gripped prior to movement of the drive piston 106 and thence the collet assembly 84 (which includes chuck jaws 98, 102).

In operation fluid under pressure is applied to the head end of the cylinder bores 38 and 55 through an inlet passageway to be presently described. A bore 156 extends axially through the piston head 132 and partially in the rod 134 of the jaw lock piston 130 and has one end communicating with the head eny of cylinder 128. The opposite end of the bore 156 is in communication with an elongated annular groove 158 in the outer surface of the rod 134 via a diametrical through bore 160. A closed passage is defined by the groove 158 and the surface defining the bore 126 in rod 112. The passage defined by groove 158 is in turn in communication with a diametrical through bore 162 in rod 112 of drive piston 106 which is in turn in communication with an elongated annular groove 164 in the outer surface of the rod 112. A closed passage is defined by the groove 164 and the surface defining the bore 40 in the cylinder housing 34. A handle 154 is secured to the rearward, outer end of cap 48 by means of snap ring assembly 155; annular seals 157, 159, and 161 are provided between the mating surfaces of cap 48 and handle 154; the handle 154 communicates the source of fluid pressure 12 to the tool 10 in a manner to be described. The handle 154 has an annular groove 170 in the outer surface of its rearward portion which defines a closed passage with the surface of cap 48. The groove 170 is in communication with the passage defined by the groove 164 via a radial bore 168, an axial bore 169 and a passageway 171 through a valve rod 208. The valve rod 208 extends through the bore 38 and the piston head 108 to communicate with the annular groove 164 via a passage 173. The passageway 171, however, does not generally communicate with the rod end of cylinder bore 38. Thus fluid under pressure can be applied to the head end of cylinder 128 through the passage defined by groove 170, bores 168, 169 and 171, the passages 173, the passage defined by groove 164, bore 162, the passage defined by groove 158, bore 160 and bore 156.

At the same time that the head end of bore 38 is in fluid communication with the return side of the source of pressure via an annular groove 175 in handle 154 and a radial bore 172 near the rearward end of the cap 48; an axial passage 177 communicates bore 172 with cylinder bore 38. The rod end of the cylinder 128 is in communication with the head end of cylinder bore 38 via a plurality of axially extending, radially inclined bores 174 in the piston head 108.

With fluid pressure applied to the head end of the cylinder 128 the jaw lock piston 130 is moved forwardly and the fluid in the rod end of cylinder 128 is expelled to the return side of the source via bores 174, the head end of cylinder bore 38 and bores 177 and 172. At this time neither side of the cylinder bore 38 is communicated to the pressure side of the source. As the lock piston 130 is moved forwardly the lower, movable jaw member 102 is moved upwardly gripping the shank 17 of pin 16 against the fixed jaw member 98.

As the lock piston 130 reaches the end of its stroke, the passage defined by groove 158 is moved into communication with a fluid path opening to the rod side of the cylinder bore 38. A diametrical bore 176 through the rod 112 of drive piston 106 has its radially inner openings blocked by the rod 134 with lock piston 130 in its rearward position. As the lock piston 130 reaches the end of its stroke the passage defined by groove 158 communicates with the bore 176. An annular groove 178 in the inner surface of the bore 40 is in communication with bore 176. An axially extending bore 182 in the cylinder member 34 communicates the rod end of cylinder bore 38 with the groove 178. The groove 158 in rod 134 of lock piston 130 is wide enough such that with the lock piston 130 in its forward position it communicates both the bores 162 and 176 in the rod 112. Thus, when the lock piston 130 moves to its forward position causing the jaws 98, 102 to grip the pin 16, fluid pressure from the source is applied to the rod end of cylinder bore 38 via a primary fluid passageway comprising bore 168, groove 170, bore 169, passageway 171, bore 173, the passage defined by groove 164, bore 162, the passage defined by groove 158, bore 176, the passage defined by groove 178, and bore 182.

With fluid pressure applied to the rod side of cylinder bore 38 the drive piston 106 is moved rearwardly; fluid is expelled from the head side of cylinder bore 38 and cavity 55 to the return side of the source via bore 172. The groove 164 in the rod 112 is located near the piston head 108 such that after the drive piston 106 has traveled a short distance, the groove 164 is in direct communication with the rod end of cylinder bore 38. Thus a secondary fluid passageway from the pressure side of the source to the rod end of cylinder bore 38 is defined. The groove 178 and bore 176 of the primary fluid passageway, previously defined, are initially in communication with each other with the drive piston 106 in its forward position and remain in communication as piston 106 moves rearwardly until the groove 164 communicates with cylinder bore 38; with further rearward movement of piston 106 the bore 176 is moved out of communication with groove 178 thereby interrupting the primary fluid passageway to the cylinder bore 38. At this time, however, fluid pressure is still applied to the rod end of cylinder bore 38 moving the drive piston 106 to its rearward position.

During this rearward movement of drive piston 106, the jaw lock piston 130 is held in its forward position thereby maintaining the jaws 98, 102 against the pin thereby maintaining the jaws 98, 102 against the pin 16. The force on the pin 16 is reacted against the collar 22 by means of the anvil 78. This relative force first pulls the head 24 of the pin 16 against the workpiece 18 and locates the locking grooves 28 concentrically with the collar 22. An increase in this force causes the anvil 78 to move over the collar 22 swaging the collar 22 into the locking grooves 28. With a further increase in this force, the shank 17 of the pin 16 is severed at the breakneck groove 30 completing the setting operation. The swaged collar 22 is then ejected from the anvil 78 in a manner to be described.

To eject the collar 22 and in order to prepare the tool 10 to receive another fastener the operator, by means to be described, now switches the bore 172 to the pressure side of the source and the bore 168 to the return side. Thus fluid under pressure is applied to the head end of cylinder bore 38 and cavity 55 and to the rod end of lock cylinder 128 via bores 174. This causes the drive piston 106 to move forwardly and the jaw lock piston 130 to move rearwardly. As the latter piston is moved rearwardly fluid from the head end of cylinder 128 can be ejected through the inlet passageway, previously described, and returned to the return side of the source. As the drive piston 106 moves forwardly fluid from the rod end of cylinder bore 38 is initially ejected through the secondary fluid passageway previously described, and returned to the return side of the source. After the drive piston 106 has been moved forwardly a distance at which the groove 164 no longer communicates with cylinder bore 38 thereby interrupting return flow through the secondary fluid passageway and with the jaw lock piston 130 returned to its rearward position interrupting return flow through the primary fluid passageway, fluid from the rod end of cylinder bore 38 is forced back to the return side of the source through slight clearances by rod 112 to communicate to bore 173, by passageway 171, etc.

With the jaw lock piston 130 in its rearward position, the lower jaw 102 can move downwardly away from bore 96 thereby releasing the severed portion of the shank 17 of pin 16. As the drive piston 106 returns to its forward position, the collar ejector 99 is moved against the collar 22 thereby ejecting the collar 22 from the anvil 78. Thus one fastener has been set and the tool 10 is in condition to receive the next fastener.

The tool 10 can be used with a remote power unit 12 which can be of the type disclosed in Patent No. 3,052,-099, issued Sept. 4, 1962. The handle 154 has passageways 186 and 188 in fluid communication with bores 168 and 172, respectively, and connected to the power unit 12 via flexible conduit members 190 and 192, respectively. A trigger 194 is located on handle 154 and is actuable to control the power source in the manner described in the latter patent whereby in one position of trigger 194 fluid under pressure is transmitted to the tool 10 via conduit 190 and fluid is returned to reservoir via conduit 192 and in another position of trigger 194 fluid under pressure is transmitted to tool 10 via conduit 192 and is returned to reservoir via conduit 190.

The rod 208 is of a diameter to fit snugly within bore 206 with a slight amount of clearance such that movement of the piston 106 is not impeded. The rear portion 211 of the rod 208 is formed with a plurality of flats whereby clearance is provided with the bore 206. The portion 211 extends for a distance whereby both sides of cylinder 110 are not in communication until the piston 106 is at its rearwardmost position. At this position the fluid pressure on the rod end of the piston 106 is relieved via the passageway provided by valve rod 208 and bore 206 with the fluid returning to the reservoir via bore 172, passageway 188, and a conduit member 192.

The rod 208 serves an additional function since it also prevents the piston 106 from rotating relative to the housing 34. A ball check valve assembly 210 is located in the cap 140 and communicates the lock cylinder 128 and bore 156 with the head end of cylinder bore 38 and cavity 55. Thus with the tool 10 in the position as shown in the FIGURE 1 and with return fluid pressure applied in the head end of cylinder bore 38 and in cavity 55 the valve assembly 210 will open permitting return to tank and relief of the fluid pressure thereby preventing possible damage to the tool. Since the axis of the jaws 98 and 102 is offset from the axis of drive piston 106, a moment is exerted on the collet body 86. In order to minimize the distortion of the collet body 86 and hence damage to the tool 10, the jaw housing 90 is made T-shaped, with the two arms 212 of the T being located to ride on guide surfaces 214 provided at the forward end of the collet housing 54. With a moment in one direction the arms 212 will engage the guide surfaces 214 and prevent distortion. To prevent distortion for a moment in the opposite direction a guide pin 216 is secured to the front of the jaw housing 90 and is adapted to be located in a bore 218 in the forward face of the collet housing 54. Thus movement in the opposite direction will be reacted by the pin 216 on bore 218 and hence distortion will be minimized. In addition to the function of distortion prevention the co-operation of the arms 212 with guide surfaces 214 and guide pin 216 with bore 218 provide a guiding function to aid the tool 10 in its normal operations.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a tool for applying a relative axial force between a pin member and a cooperating surface, said tool comprising: a longitudinally extending housing assembly having a first cylinder at one end having its axis extending longitudinally, said housing assembly having a generally opened channel portion at its opposite end, said channel portion terminating at said opposite end in a transversely extending anvil portion, an anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, jaw means located in said housing for movement toward and away from each other for gripping the pin of the fastener and operable for pulling the pin of the fastener as said collet member moves in a first longitudinal direction, a drive piston supported in said first cylinder and reciprocable along said first cylinder axis and operably connected with said collet member for moving said collet member, support means independent of the internal surface of said channel portion and on said housing and on said collet member for guiding the movement of said collet member and for reacting the moment resulting from the lateral spacing of said first cylinder axis and the axis of said opening.

2. The tool of claim 1 with said support means comprising first means for reacting the moment tending to move said collet member out of said channel portion.

3. The tool of claim 2 with said first means comprising a guide pin and an aperture located at the forward ends of said collet member and said housing.

4. The tool of claim 3 with said guide pin fixed to said collet member at a point above its lower extremity in said channel portion and with said aperture located on said housing and in axial alignment with said guide pin with the surface of said aperture being proximate to said guide pin whereby the moment tending to move said collet member out of said channel portion is reacted.

5. The tool of claim 1 with said support means comprising second means for reacting the moment urging said collet member in a direction toward said channel portion.

6. The tool of claim 5 with said second means comprising an arm extending from one side of said collet member at a point above its lower extremity in said channel portion and a guide surface located on said housing and adapted to be engaged by said arm.

7. The tool of claim 3 with said support means comprising second means for reacting the moment tending to move said collet member into said channel portion.

8. The tool of claim 7 with said second means comprising an arm extending from one side of said collet member at a point above its lower extremity in said channel portion and a guide surface located on said housing and adapted to be engaged by said arm.

9. The tool of claim 7 with said collet member being T-shaped at its forward end and with said second means comprising the opposite arms of the T, said second means further comprising a pair of guide surfaces on opposite sides of said housing at its forward, upper end for engaging said arms whereby the moment tending to move said collet member into said channel portion is reacted.

10. The tool of claim 9 with said jaw means comprising: a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, said drive piston having a piston head located in said cylinder and having a second cylinder located therein coaxially with said first cylinder axis, said drive piston having an end portion extending coaxially, longitudinally from said piston head and fixed to said collet member, a lock piston supported in said second cylinder and reciprocable along said first cylinder axis, said piston member having a coaxially entending rod portion extending through said rod portion of said drive piston and within said collet member and into engagmeent with said movable jaw member for moving said movable jaw member transversely toward said fixed jaw member responsively to longitudinal movement of said lock piston in one direction, first fluid circuit means selectively actuable for driving said lock piston in said one direction for driving said drive piston in said first direction.

11. The tool of claim 10 further comprising valve means for fluid communicating said first cylinder on opposite sides of said drive piston, said valve means comprising first valve means for fluid communicating said first cylinder on opposite sides with said drive piston in an extreme position and second valve means pressure responsive for fluid communicating said first cylinder on opposite sides normally with said piston in an opposite extreme position.

12. The tool of claim 11 with said second valve means comprising a check valve located in said lock piston.

References Cited

UNITED STATES PATENTS

| 2,396,001 | 3/1946 | Fischer | 72—391 |
| 2,445,067 | 7/1948 | Hiler | 72—391 |
| 3,197,840 | 8/1965 | Van Hecke | 29—34 |

CHARLES W. LANHAM, Primary Examiner

GENE P. CROSBY, Assistant Examiner

U.S. Cl. X.R.

72—453